United States Patent [19]

Addor

[11] 4,060,632

[45] * Nov. 29, 1977

[54] METHOD FOR CONTROLLING ACARINA

[75] Inventor: Roger Williams Addor, Pennington, N.J.

[73] Assignee: American Cyanamid Company, Stamford, Conn.

[*] Notice: The portion of the term of this patent subsequent to June 29, 1993, has been disclaimed.

[21] Appl. No.: 652,920

[22] Filed: Jan. 28, 1976

Related U.S. Application Data

[63] Continuation-in-part of Ser. No. 550,105, Feb. 13, 1975, Pat. No. 3,966,959.

[51] Int. Cl.$^2$ .......................... A01N 9/20; A01N 9/24
[52] U.S. Cl. .................................... 424/304; 424/306; 424/308

[58] Field of Search ................ 424/304, 305, 306, 308

[56] References Cited

U.S. PATENT DOCUMENTS 3,966,959   6/1976   Addor .................................. 424/304

FOREIGN PATENT DOCUMENTS 820,418   3/1975   Belgium.

OTHER PUBLICATIONS

Annual Review of Biochemistry, vol. 40, pp. 1079, 1096 & 1097 (1971).

Primary Examiner—Leonard Schenkman
Attorney, Agent, or Firm—H. G. Jackson

[57] ABSTRACT

This invention relates to the use of m-phenoxy-benzyl esters of spirocarboxylic acids as acaricidal agents.

7 Claims, No Drawings

1

METHOD FOR CONTROLLING ACARINA

CROSS REFERENCE TO RELATED APPLICATION

This is a continuation-in-part of copending application Ser. No. 550,105, filed Feb. 13, 1975 now U.S. Pat. No. 3,966,959 (1976). Michael S. Schrider's copending application Ser. No. 550,106 filed Feb. 13, 1975 now U.S. Pat. No. 3,962,458 (1976) discloses a method for the systematic control of ectoparasites wherein compounds useful in the invention of this application are administered to homothermic animals.

BACKGROUND OF THE INVENTION

1. Field of the Invention

The field of the invention is acarina control.

2. The Prior Art

Pyrethrin-like compounds (pyrethroids) are known in the chemical art. Many such compounds have been shown to possess insecticidal properties, but most have failed to provide entirely satisfactory insect and/or acarina control. None, to the best of our knowledge, has been suggested for the control of soil-borne insects and, with few exceptions, all have been subject to extremely rapid degradation to non-toxic substances. This latter property has been recognized in the past as a major deficiency of the pyrethroids. While such compounds have provided excellent knockdown of insects, rapid degradation of said compounds has resulted in lack of residual insect control even for a few days.

In this regard, it is well-known that pyrethrins and synthetic pyrethroids are generally too unstable to air and light to be useful for the control of agronomic and forest insects [Y. L. Chen and J. E. Casida, J. Agr. Food Chem., 17, 208 (1969) ]. Although this rapid degradation may be desirable for environmental reasons, it is of course obvious that there must be sufficient residual presence of the toxicant to ensure economic control of a particular pest.

To this end, a great deal of effort has been expended in attempting to effect sufficient stabilization of existing materials, through the use of light absorbers and antioxidants, to allow their useful application, e.g. see R. P. Miskus and J. S. Andrews, J. Agr. Food Chem., 20, 313 (1972).

Another approach to the development of highly active effective pyrethroid insecticides has involved a search for molecular types which retain a high degree of insecticidal activity typical of the best pyrethroids while introducing sufficient stability to air and light to ensure their applicability in the field. An apparent success in this effort is the recent discovery by Elliott and co-workers of the compound m-phenoxybenzyl (+)-cis, trans-2,2-dimethyl-3(2,2-dichlorovinyl)cyclopropane carboxylate [M. Elliott et al., Nature 246, 169 (1973) ]. The improved stability of this compound (permethrin) has resulted in part from the replacement of the oxidatively susceptible dimethylvinyl side-chain on the cyclopropane ring of chrysanthemic acid by a dichlorovinyl substituent. Such an improvement might indeed have been anticipated based on Chen and Casida's earlier work. However, the fortuitous combination of improved stability and high degree of insecticidal activity found by Elliott was unexpected.

This invention utilizes a new series of esters which, in addition to showing an amazing degree of insecticidal activity, are unexpectedly stable on plant surfaces. This sought for but most difficult to find combination of activity and stability result from novel esters of the type described herein.

Unlike permethrin, these compounds do not rely on replacement of essential methyl groups by chlorine atoms to effect greater stability. Indeed, no atoms other than carbon, hydrogen, and oxygen are present. Thus it is surprising that the esters of this invention are not susceptible to the immediate light-promoted oxidative degradation which limits the agronomic effectiveness of most of the pyrethroids disclosed to date.

It is an object of this invention to provide pyrethroids which are highly effective topical insecticidal and acaricidal agents, particularly ixodicidal agents, useful for the treatment of warm-blooded or homothermic animals.

This invention also relates to a method for controlling ixodid ticks by applying a fecundity-suppressing amount of a compound of this invention to adult ticks, or to the habitat or dietary media of ixodid ticks.

U.S. Pat. No. 3,835,176, issued Sept. 10, 1974 and U.S. Pat. No. 3,823,177, issued July 9, 1974. The U.S. Pat. No. 3,835,176 patent to Matsuo et al. discloses alpha-cyanobenzyl cyclopropanecarboxylates as insecticial agents. These compounds are effective as stated; however, they are not said to be useful for control of soil insects or exhibit extended residual insecticidal activity. The U.S. Pat. No. 3,823,177 patent to Fanta et al. relates to insecticidal esters of spirocarboxylic acids. However, like the U.S. Pat. No. 3,835,176 patent, Fanta et al. do not suggest soil insecticidal activity, or extended residual activity.

SUMMARY OF THE INVENTION

The invention is the use of novel phenoxybenzyl esters of spirocarboxylic acids for the formula:

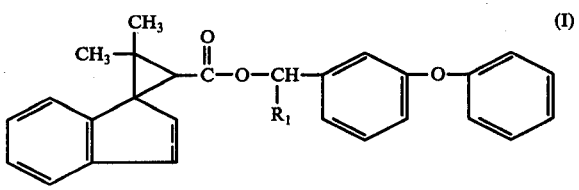

wherein $R_1$ is hydrogen, cyano or ethynyl, represents a single or double bond and the optical and geometric isomers thereof for the control of acarina, by contacting the acarina, their habitat or their food supply, with fecundity-suppressing amount of a phenoxybenzyl ester of a spirocarboxylic acid, represented by formula I above.

DETAILED DESCRIPTION

The phenoxybenzyl esters of spirocarboxylic acids depicted by formula I, can be prepared by reacting approximately equimolar amounts of an acid halide, preferably the chloride, of a spirocarboxylic acid (IV) and a m-phenoxybenzyl alcohol (V). The reaction is generally conducted in the presence of a suitable solvent such as benzene, toluene, diethyl ether, or the like, at a temperature between about 10° C. and 30° C., and in the presence of an acid acceptor such as an organic tertiaryamine such as triethylamine, trimethylamine, pyridine, or the like. The reaction can be graphically illustrated as follows:

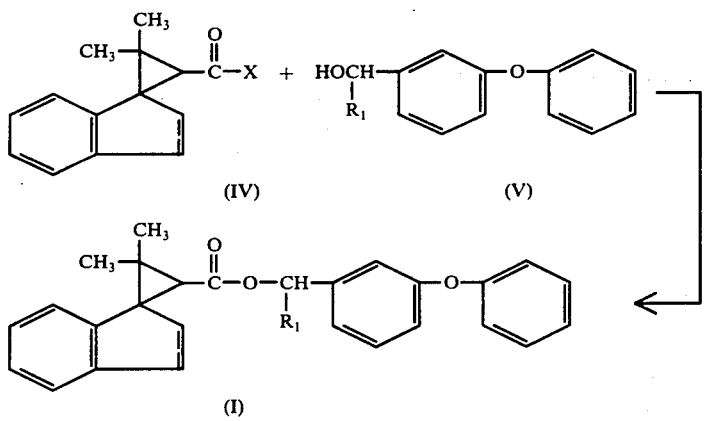

wherein $R_1$ is hydrogen, cyano, or ethynyl, and X is halogen, preferably chloro.

The spirocarboxylic acid halide (IV) is readily obtained by reaction of the appropriate spirocarboxylic acid (III) with a thionyl halide such as thionyl chloride, thionyl bromide or a phosphorus halide such as phosphorus trichloride or phosphorus oxychloride in the presence of an organic solvent such as toluene, benzene or benzenehexane mixture. This reaction may be conducted at room temperature or above. Preferably it is conducted using thionyl chloride and an equimolar amount of pyridine in the temperature range of 25° C. to 50° C.; and can be illustrated as follows:

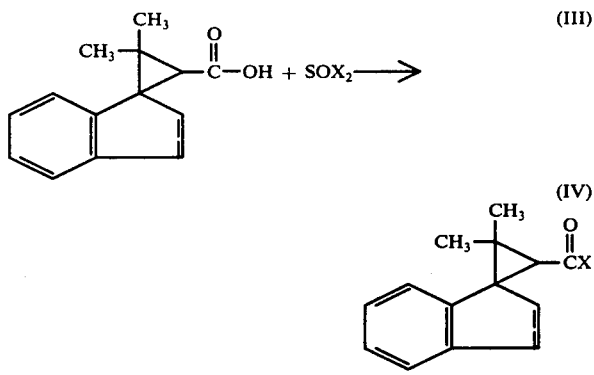

In accordance with this invention, it should also be understood that various geometric isomers as well as optical isomers of the above-identified compounds do result from the preparations described. For example, in the synthesis of the 3,3-dimethylspiro [cyclopropane-1,1'-indene]-2-carboxylic and 3,3-dimethylspiro [cyclopropane-1,1'-indane]-2-carboxylic acid esters of m-phenoxybenzyl alcohol, d and l isomeric pairs are formed. In the preparation of the α-cyano- and α-ethynyl-m-phenoxybenzyl esters, an additional chiral center is introduced, and this allows for additional d, l pairs. Additionally, the above said esters derived from 3,3-dimethylspiro-[cyclopropane-1,1'-indene]-2-carboxylic acid and 3,3-dimethylspiro[cyclopropane-1,1'-indane]-2-carboxylic acid will be further complicated by the presence of cis and trans isomers.

These isomers will, of course, vary somewhat in the degree of acaricidal activity which they exhibit; however, they are useful as acaricidal agents.

For use as animal systemic acaricidal agents, the compounds can be administered to the animal host either orally or parenterally. When given orally, it may be any convenient form designed for oral administration such as a bolus, capsule, tablet or as an oral drench. The active agent may also be incorporated in an edible animal feedstuff such as a nutritionally balanced diet containing from 0.01% to 3.0%, and preferably 0.01% to 1.5% by weight of feed of the active compound.

If desired, the systemic acaricidal agent may be introduced into the body of the animal by subcutaneous, intramuscular or intraperitoneal injection, such that it may be distributed through the animal's body by the action of the animal's circulatory system. In practice, the systemic agent may be dissolved or dispersed in a pharmaceutically acceptable carrier such as water, propylene glycol, vegetable oil, glycerol formal, or the like, for administration.

Advantageously, the systemic agents have relatively low mammalian toxicity and are effective for protecting a variety of animals, particularly livestock and domestic animals such as cattle, sheep, horses, dogs, cats, and the like, from attack by ticks.

The compounds are highly effective as contact and stomach poisons for ixodide ticks and for a wide variety of insects, particularly Dipterous, Lepidopterous, Coleopterous and Homopterous insects. Moreover, these compounds are unique pyrethroids, in that they exhibit extended residual insecticidal activity and are surprisingly effective for the control of soil-borne insects. They do not require admixture with a stabilized phenol derivative such as bisphenols, BHT, arylamines, or the like, to achieve acaricidal compositions having stabilized effects; however, they may be used in combination with other biological chemicals, for example, pyrethroid synergists such as piperonyl butoxide, sesamex or n-octyl sulfoxide of isosafrole.

The invention is further demonstrated by the nonlimiting examples provided below.

EXAMPLE 1

Preparation of 3,3'-dimethylspiro[cyclopropane-1,1'-indene]-2-carboxylic acid, m-phenoxybenzyl ester

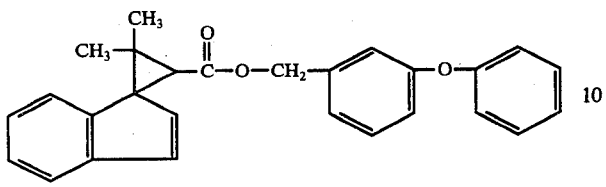

To 4.3 g (0.02 mol) of 3,3-dimethylspiro[cyclopropane-1,1'-indene]-2-carboxylic acid in either hexane/benzene or benzene is added 8 ml of thionyl chloride. The solution is then stirred for 12 hours at room temperature. The solvent is then removed in vacuo leaving 4.7 g of an orange liquid (theoretical yield). Infrared indicates an acid chloride carbonyl at 1790 cm$^{-1}$.

The acid chloride and 4.0 g (0.02 mol) of m-phenoxy benzyl alcohol are dissolved in 20 ml. of ether, and 2.1 g (0.02 mol) of triethylamine dissolved in 8 ml. of ether is added dropwise at 20° C. Solids precipitate from solution immediately. The resulting mixture is stirred for 12 hours at room temperature. The crude product is partitioned in an ether/water mixture, and the ether layer is dried over magnesium sulfate and concentrated in vacuo in yield 7.7 g. (96% theory) of a brown liquid.

The crude product is purified by dry-column chromatography on silica gel using 25% methylene chloride in hexane as a solvent. 4.4 Grams of a pale yellow liquid is obtained. The infrared spectrum shows an ester carbonyl band at 1720 cm$^{-1}$. The nuclear magnetic resonance spectrum (CCl$_4$) shows the following: $\sigma$ = 1.41, 1.45, 1.58, 1.66 (4S, 6H, methyls) 2.61 (S, 1H, cyclopropane H), 4.85-5.10 (m, 2H, O—CH$_2$), 6.12 (d, 0.5H, J = 5.5 Hz, vinyl), 6.66-7.76 (m, 14.5H aromatic and vinyl).

Analyses: Calculated for C$_{27}$H$_{24}$O$_3$: C, 81,83: H, 6.06. Found: C, 82.14; H, 6.29.

EXAMPLE 2

Preparation of 3,3-dimethylspiro[cyclopropane-1,1'-indene]2-carboxylic acid, α-cyano-m-phenoxybenzyl ester

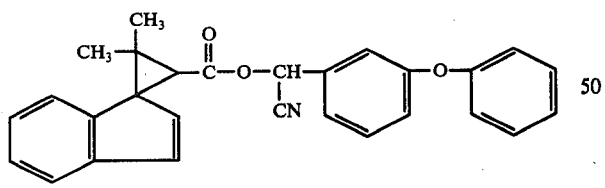

3,3-Dimethylspiro[cyclopropane-1,1'-indene]-2-carboxylic acid, 3.4 g, is dissolved in 100 ml of a hexane/benzene (4:1) solution. Thionyl chloride, 15.0 g, is then added and the solution is stirred for 12 hours. Refluxing is carried out for 20 minutes, and the volume is reduced in vacuo to remove solvents and excess thionyl chloride. The acid chloride is used directly without further purification. The acid chloride is taken up in 20 ml. of benzene and is added dropwise to a solution of 3.1 g of α-cyano-m-phenoxybenzyl alcohol and 1.0 g of pyridine in 100 ml of benzene. After 4 hours, the precipitate is filtered, and the filtrate reduced in vacuo to give a viscous oil. Purification by column chromatography on silica gel with elution by chloroform/hexane (1:2) gives 1.3 g of pale yellow oil which exhibits the following spectral properties: infrared spectrum (neat film) 1730 cm$^{-1}$; nuclear magnetic resonance spectrum (CDCl$_3$) δ = 6.8=7.6 (m, 14.5H, aromatic and vinyl), 6.37 (m, 1H,

6.22 (d, 0.5H, vinyl), 2.73 (m, 1H,

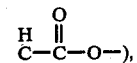

1.72-1.43 (m, 6H, methyls).

EXAMPLE 3

Preparation of 3,3-dimethylspiro[cyclopropane-1,1'-indane]-2-carboxylic acid, m-phenoxybenzyl ester.

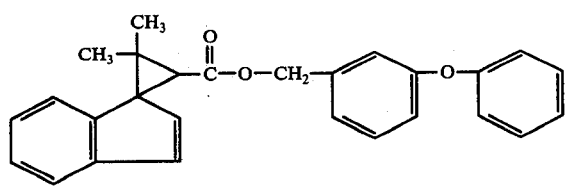

The procedure of Example 1 is followed using 3,3-dimethylspiro[cyclopropane-1,1'-indane]-2-carboxylic acid in place of 3,3-dimethylspiro[cyclopropane-1,1'-indene]-2-carboxylic acid to give the crude product as an oil. The pure ester obtained by chromatography had the following spectral properties: Infrared spectrum (neat film) 1720 cm$^{-1}$; nuclear magnetic resonance spectrum (CCl$_4$) δ = 6.7-7.6 (m, 13H, aromatic), 4.8-5.1 (m, 2H, O—CH$_2$), 1.1-3.2 (m, 11H, CH$_3$, indane CH$_2$, and cyclopropane H).

EXAMPLE 4

Preparation of 3,3-dimethylspiro[cyclopropane-1,1'-indane]2-carboxylic acid, α-cyano-m-phenoxybenzyl ester.

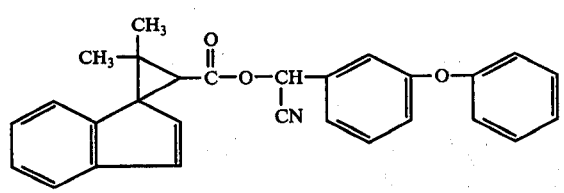

The procedure of Example 2 is followed using 3,3-dimethylspiro[cyclopropane-1,1'-indane]-2-carboxylic acid in place of 3,3-dimethylspiro[cyclopropane-1,1'-indene]-2-carboxylic acid to give the crude product.

EXAMPLE 5

Preparation of 3,3-dimethylspiro[cyclopropane-1,1'-indene]-2-carboxylic acid, m-phenoxybenzyl ester.

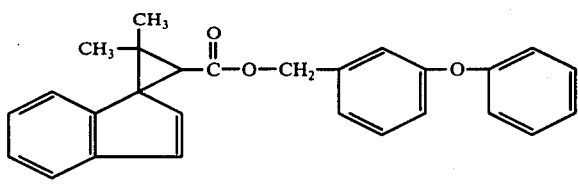

STEP I

To 4.3 g of 3,3-dimethylspiro[cyclopropane-1,1'-indane]-2-carboxylic acid in 75 ml of n-hexane is added 10 ml of thionyl chloride. The solution is then stirred at room temperature for 2 days.

The clear pale orange solution is concentrated under vacuum to yield 4.7 g (100% theory) of an orange liquid. IR shows a carbonyl stretch at 1780 cm$^{-1}$, typical for an acid chloride.

STEP II

To 4.7 g of the above acid chloride and 4.0 g of m-phenoxybenzyl alcohol in 50 ml of ether is added 2.1 of triethylamine in 8.0 ml of ether, dropwise, with cooling. Solids begin to precipitate immediately. After 3 hours at room temperature, the crude product is worked up in ether and then H$_2$O.

The resulting crude product is then purified by dry-column chromatography using a silica gel packing and 25% CH$_2$Cl$_2$/hexane as a solvent for development. There is obtained 3.9 g (49% theory) of a pale yellow viscous liquid. IR shows a carbonyl stretch at 1720 cm$^{-1}$, NM R[δ= 1.1-3.2 (11 H, (CH$_3$)$_2$,

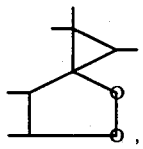

cyclopropane H), 4.8-5.1 (2H, —OCH$_2$—), 6.7–7.6 (13 H, aromatic)] confirms the assigned structure.

Analysis calculated for O$_3$C$_{27}$H$_{26}$: C, 81.42; H, 6.53. Found: C, 81.57; H, 6.97.

EXAMPLE 6

Preparation of 3,3-dimethylspiro[cyclopropane-1,1'-indane]-2-carboxylic acid, α-cyano-m-phenoxybenzyl ester.

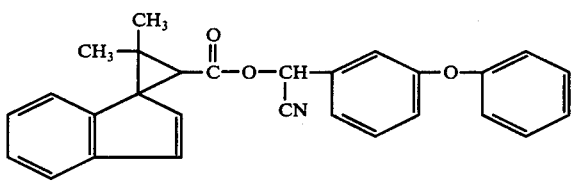

3,3'-Dimethylspiro[cyclopropane-1,1'-indane]-2-carboxylic acid, 4.1 g, is refluxed in 20 ml of thionyl chloride for 1 hour and then stripped at 50° C. using water aspirator pressure to remove excess thionyl chloride.

The acid chloride thus formed is taken up in 50 ml of benzene and added to a 50 ml benzene solution of 3.1 g of α-cyano-m-phenoxybenzyl alcohol and 1.5 g of pyridine. Stirring of the solution is then continued for 18 hours. The reaction is worked up by filtration of the precipitate and removal of the solvent in vacuo to give a light yellow oil. Purification by dry column chromatography on silica gel with elution by ethyl acetate:hexane (1:9) gives 4.1 g of pale yellow viscous oil.

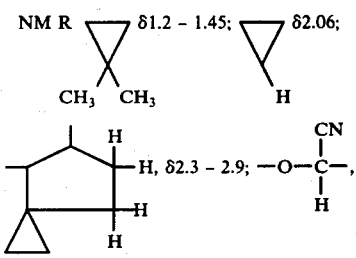

δ6.36; aromatic δ6.8–7.6
IR carbonyl 1725 cm$^{-1}$.

Analysis calculated for C$_{28}$H$_{25}$NO$_3$; C, 79.41; H, 5.95; N, 3.31. Found: C, 78.22; H, 6.06; N, 3.15.

EXAMPLE 7

3,3'-Dimethylspiro[cyclopropane-1,1'-indene]-2-carboxylic acid, α-ethynyl-m-phenoxybenzyl ester.

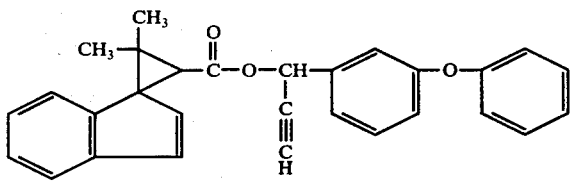

The procedure of Example 1 is followed using α-ethynyl-m-phenoxybenzyl alcohol in place of m-phenoxybenzyl alcohol to give the product as an oil.

EXAMPLE 8

3,3-Dimethylspiro[cyclopropane-1,1'-indane]-2-carboxylic acid, α-ethynyl-m-phenoxybenzyl ester.

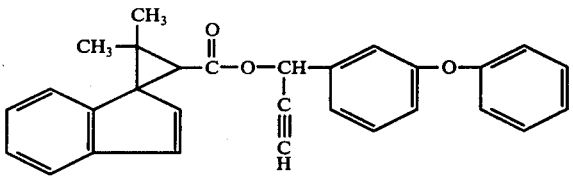

The procedure of Example 1 is followed using 2,2-dimethylspiro[cyclopropane-1,1'-indane]-2-carboxylic acid in place of 2,2-dimethylspiro[cyclopropane-1,1'-indene]-2-carboxylic acid and α-ethynyl-m-phenoxybenzyl alcohol in place of m-phenoxybenzyl alcohol to give the product as an oil.

EXAMPLE 9

Insecticidal Activity

The unique insecticidal activity of the compounds of the present invention, over a variety of pyrethroid type insecticides, is further demonstrated by the following tests.

The test procedures employed for evaluation against Boll weevills, Southern Armyworms and Tobacco Budworms are described in the preceeding examples. The procedures employed for evaluation against mosquito larvae and Mexican Bean Beetles as follows.

Malaria Mosquito — Anopheles quodrimaculatus Say

1 Milliter of a 35% water/65% acetone solution containing 300 ppm of test compound is pipetted in a 400 ml beaker containing 250 ml of deionized water and stirred with the pipette, giving a concentration of 1.2 ppm. A wax paper ring ¼ inch wide to fit inside the beaker is floated on the surface of the test solution to keep the eggs from floating up the meniscus curve and drying out on the side of the glass. A spoon made of screen is used to scoop up and transfer about 100 eggs (0–24 hours old) into the test beaker. After 2 days at 80° F., 50% r.h., observations of hatching are made. Mexican Bean Beetle — Epilachna varivestis Mulsant Sieva lima bean plants (2 per pot) with primary leaves 3 to 4 inches long, are dipped in the 300 ppm test solution and set in the hood to dry. One leaf is removed from a plant and placed in a 4 inch petri dish containing a moist filter paper on the bottom and 10 last-instar larvae (13 days from hatching). The day after treatment, another leaf is removed from the plant and fed to the larvae after removing the remains of the original leaf. Two days after treatment, the third leaf is fed to the larvae, this usually being the last needed. The fourth leaf is used on the third day after treatment if the larvae have not finished feeding. The test is now set aside and held until adults have emerged, usually in about 9 days after treatment began. After emergence is complete, each dish is examined for dead larvae, pupae or adults; deformed pupae or adults; larval-pupal intermediates or pupal-adult intermediates; or any other interference with normal molting, transformation and emergence of pupae or adults.

Data obtained are reported in the table below.

Southern Armyworm — Spodoptera eridania (Cramer) Methods:

Sieva lima bean plants pruned back to two expanded 3 to 4 inches primary leaves are dipped three seconds with agitation in the treatment solutions and then set in a hood to dry. After the leaves are dry they are excised and each excised leaf is placed in a 4 inch petri dish containing a piece of moist filter paper and ten third-instar southern armyworm larvae approximately ⅜ of an inch long. The petri dishes are covered and placed in a holding room for 2 days at a temperature of 80° F. and 50% relative humidity.

Mortality counts are made after 2 days. Compounds which produce a larval kill are held for an extra day and counted again.

| | Insecticidal Activity | | | | | | | | | | | |
|---|---|---|---|---|---|---|---|---|---|---|---|---|
| | Mosquito Larvae ppm | | | | Boll Weevil ppm | Southern Armyworms ppm | | | Mexican Bean Beetles ppm | | Tobacco Budworm ppm | |
| Compound | 1.2 | .4 | .04 | .004 | 1000 | 1000 | 100 | 10 | 300 | 100 | 1000 | 100 |
| CH₃-C(CH₃)(indanyl)-CO-OCH(CN)-C₆H₄-O-C₆H₅ | 100 | 100 | 100 | 100 | 100 | 100 | 100 | 100 | 100 | 100 | 100 | 100 |
| CH₃-C(CH₃)(indanyl)-CO-OCH₂-C₆H₄-O-C₆H₅ | — | 100 | 100 | — | 30 | 100 | 100 | 0 | — | — | 100 | 80 |
| CH₃-C(CH₃)(indanyl)-CO-OCH₂-C₆H₄-O-C₆H₅ | 100 | 100 | 100 | 50 | 100 | 100 | 100 | 90 | 100 | 90 | 100 | 100 |
| CH₃-C(CH₃)(indanyl)-CO-OCH(CN)-C₆H₄-O-C₆H₅ | — | 100 | 100 | 50 | 100 | 100 | 100 | 0 | 100 | 70 | 100 | 80 |

— = No Test

EXAMPLE 10

Residual Insecticial Activity

Leaf Dip Test

Young cotton plants with 2 or 3 expanded true leaves are dipped into 65% acetone/water solutions to thoroughly wet the leaves. The leaves are allowed to dry before the initial leaf samples are removed for bioassay with southern armyworm, Prodenia eridania (Cramer), tobacco budworm, Heliothis virescens (Fabricius) or cabbage looper, Trichoplusia ni (Hubner). Leaf samples are placed in a standard glass petri dish containing moist filter paper and 10 third instar southern armyworm or cabbage loopers. For the tobacco budworm assay, a single leaf is cut into sections of about ½ square inch and placed in individual medicine cups with a moist dental wick and one tobacco budworm larvae. The assay samples are held at a constant temperature of 80° F. for 72 hours when mortality counts are made and the corrected percent mortality determined.

The treatment solutions are prepared by dissolving 100 mg of test compound in 65 ml of acetone then making the solution to 100 ml with deionized water to give a 1000 ppm concentration of the compound. Ten fold dilutions are prepared by taking 10 ml of the 1000 ppm solution and diluting to 100 ml with 65% acetone and water for 100 ppm. Then 10 ml of the 100 ppm solution is diluted the same way to give a 10 ppm solution.

After the leaves have dried the plants are removed to the greenhouse section fitted with polymethyl methacrylate panels which permit the penetration of ultraviolet light for determination of the residual insecticidal persistance of the compound. Leaf samples are removed for bioassay over a 9 to 10 day period.

Data obtained are reported in the table below where it can be seen that the compounds of the present invention are highly effective as insecticidal agents for an extended period of time when applied to plants as a liquid formulation containing from about 100 ppm to 1000 ppm of active compound.

female *Boophilus microplus* ticks which have dropped from cattle are collected and used for testing.

The compound to be tested is dissolved in a 35% acetone/65% water mixture in sufficient amount to provide 15.62, 31.25, 62.5, 125 and 250 ppm; of compound in the test solution. Fifteen ticks per treatment are used and they are immersed in test solution for 3 to 5 minutes, then removed and placed in dishes and held in incubators for 2 to 3 weeks 28° C. Counts of ticks laying eggs are then made and recorded. Eggs which were laid are weighed and placed in containers and kept for one month to observe hatching and to determine chemosterilant effect. For each test, fifteen ethion-resistant ticks are used since they are the most difficult of their kind to control. Results of these tests are given in the tables below.

Efficacy is determined on the percent reduction in weight of egg masses over controls and is reported for each concentration of chemical applied.

The effectiveness of test chemicals for suppressing the fecundity of ixodid ticks is also determined on the basis of the 3 highest rates of application, e.g 62.5 ppm; 125 ppm and 250 ppm, employing the rating system given below.

| RATING SYSTEM | |
|---|---|
| Result | Score |
| No oviposition | 4 |
| Partial ovipositions, no hatch | 3 |
| Total oviposition, no hatch | 2 |
| Partial oviposition, viable eggs | 1 |
| Normal oviposition and hatch | 0 |

| | | Residual Insecticidal Activity | | | | | | | | | | | |
|---|---|---|---|---|---|---|---|---|---|---|---|---|---|
| | | Percent Corrected Mortality | | | | | | | | | | | |
| | | 0 Days | | | 7 Days | | | 9 Days | | | 10 Days | | |
| Compound | Conc. (ppm) | Cabbage Looper | SAW | TBW | Cabbage Looper | SAW | TBW | Cabbage Looper | SAW | TBW | Cabbage Looper | SAW | TBW |
| 3,3'-Dimethylspiro-[cyclopropane-1,1'-indene]-2-carboxylic acid, m phenoxybenzyl ester | 1000 100 | | 100 100 | 100 100 | 100 60 | 100 50 | 100 20 | 100 75 | 100 38 | 80 40 | | | |
| 3,3'-Dimethylspiro-[cyclopropane-1,1'-indene]-2-carboxylic-acid, αcyano-m-phenoxybenzyl ester | 1000 100 | | 100 100 | 100 80 | 100 70 | 100 80 | | | | | | 100 90 | 80 20 |

SAW = Southern Armyworm
TBW = Tobacco Budworm

EXAMPLE 11

Suppression of Fecundity and Chemosterilant Effect in Ixodidae

The efficacy of the compounds of the present invention for suppression of fecundity in ticks is demonstrated in the following tests wherein engorged adult The rating system is based on the summation of scores from all ticks in the above-said tests. Using this rating system the best score possible would be 180 or 45 (the total number of ticks used) × 4 (the highest score). The efficacy is reported as percent of the best possible score.

| Percent Reduction in Weight of Egg Masses Over Controls | | | | | |
|---|---|---|---|---|---|
| | % Reduction in Weight of Egg Masses PPM | | | | |
| Compound | 250 | 125 | 62.5 | 31.25 | 15.62 |
| 3,3-Dimethylspiro[cyclopropane-1,1'-indene]-2-carboxylic acid, m-phenoxybenzyl ester | 95.93 | 97.96 | 92.37 | 50.64 | 50.13 |
| 3,3-Dimethylspiro[cyclopropane-1,1'-indene]-2-carboxylic acid, α-cyano-m-phenoxybenzyl ester | 99.49 | 96.95 | 88.30 | 68.96 | 34.86 |
| 3,3-Dimethylspiro[cyclopropane-1,1'-indane]-2-carboxylic acid, m-phenoxybenzyl ester | 89.31 | 49.11 | 28.24 | 18.58 | 0 |
| 3,3-Dimethylspiro[cyclopropane-1,1'- | 100 | 83.21 | 97.96 | 44.53 | 13.99 |

-continued

Percent Reduction in Weight of Egg Masses Over Controls

| Compound | % Reduction in Weight of Egg Masses PPM | | | | |
|---|---|---|---|---|---|
| | 250 | 125 | 62.5 | 31.25 | 15.62 |
| indane]-2-carboxylic acid, α-cyano-m-phenoxybenzyl ester | | | | | |

From these data it can be seen that the spirocarboxylic acid compounds provided excellent ixodid control through the suppression of fecundity of ixodid ticks when, applied at dose levels of 62.5 ppm or higher. It can also be seen that ixodid tick control is virtually complete when the compounds of the invention are applied at the 250 ppm dose level.

Chemosterilant Efficacy of Spirocarboxylic Acids

| Compound | Rate PPM | Ethion Resistant Ticks Oviposition | | | | % Efficacy |
|---|---|---|---|---|---|---|
| | | Partial | | Total | | |
| | | No. | No. Steril | No. | No. Steril | |
| 3,3'-Dimethylspiro[cyclopropane-1,1'-indene]-2-carboxylic acid, m-phenoxybenzyl ester | 250 | 0 0 | 0 0 | 0 1 | 0 0 | 90 |
| | 125 | 0 2 | 0 1 | 0 0 | 0 0 | |
| | 62.5 | 0 2 | 0 2 | 0 1 | 0 0 | |
| 3,3'-Dimethylspiro[cyclopropane-1,1'-indene]-2-carboxylic acid, α-cyano-m-phenoxybenzyl ester | 250 | 0 1 | 0 0 | 0 0 | 0 0 | 92.2 |
| | 125 | 0 1 | 0 0 | 0 0 | 0 0 | |
| | 62.5 | 0 2 | 0 1 | 0 1 | 0 0 | |
| 3,3'-Dimethylspiro[cyclopropane-1,1'-indane]-2-carboxylic acid, m-phenoxybenzyl ester | 250 | 0 3 | 0 1 | 0 2 | 0 0 | 48.3 |
| | 125 | 0 2 | 0 0 | 0 7 | 0 1 | |
| | 62.5 | 0 1 | 0 1 | 1 1 | 0 1 | |
| 3,3'-Dimethylspiro[cyclopropane-1,1'-indane]-2-carboxylic acid, α-cyano-m-phenoxybenzyl ester | 250 | 0 0 | 0 0 | 0 0 | 0 0 | 90.5 |
| | 125 | 0 2 | 0 1 | 0 3 | 0 0 | |
| | 62.5 | 0 1 | 0 1 | 0 0 | 0 0 | |

It can be seen from the above data that from about 90% to 100% control of ixodid ticks can be achieved with the compounds of this invention applied at the 250 ppm concentration.

I claim:

1. A method for controlling ticks which comprises applying to adult ticks, a fecundity-suppressing amount of a spirocarboxylic acid compound having the formula wherein $R_1$ is hydrogen, cyano or ethynyl, is a double or single bond and the steroisomers of the compounds.

2. The method according to claim 1 wherein the compound is 3,3'-dimethylspiro[cyclopropane-1,1'-indene]-2-carboxylic acid, m-phenoxybenzyl ester.

3. The method according to claim 1 wherein the compound is 3,3'-dimethylspiro[cyclopropane-1,1'-indene]-2-carboxylic acid, α-cyano-m-phenoxybenzyl ester.

4. The method according to claim 1 wherein the compound is 3,3'-dimethylspiro[cyclopropane-1,1'-indane]-2-carboxylic acid, m-phenoxybenzyl ester.

5. The method according to claim 1 wherein the compound is 3,3'-dimethylspiro[cyclopropane-1,1'-indane]-2-carboxylic acid, α-cyano-m-phenoxybenzyl ester.

6. The method according to claim 1 wherein the compound is 3,3'-dimethylspiro[cyclopropane-1,1'-indene]-2-carboxylic acid, α-ethynyl-m-phenoxybenzyl ester.

7. The method according to claim 1 wherein the compound is b 3,3'-dimethylspiro[cyclopropane-1,1'-indane]-2-carboxylic acid, α-ethynyl-m-phenoxybenzyl ester.

* * * * *